US006077806A

United States Patent [19]
Cribbs et al.

[11] Patent Number: 6,077,806
[45] Date of Patent: *Jun. 20, 2000

[54] CATALYST SYSTEM CONTAINING REACTION PRODUCT OF LIQUID SILICONE AND POLYAMINE

[75] Inventors: Leonard V. Cribbs, Houston, Tex.; John A. Tyrell, Williamsville; Sandor Nagy, Grand Island, both of N.Y.

[73] Assignee: Equistar Chemicals, LP, Houston, Tex.

[*] Notice: This patent is subject to a terminal disclaimer.

[21] Appl. No.: 08/813,929

[22] Filed: Mar. 6, 1997

[51] Int. Cl.⁷ ...................................................... B01J 31/18
[52] U.S. Cl. ........................... 502/167; 502/152; 502/158; 502/169; 502/200; 526/128; 526/160; 526/943; 526/141
[58] Field of Search ..................................... 502/152, 158, 502/162, 167, 169, 200

[56] References Cited

U.S. PATENT DOCUMENTS

| | | | |
|---|---|---|---|
| 4,604,442 | 8/1986 | Rich | 528/28 |
| 4,945,076 | 7/1990 | Piotrowski | 502/117 |
| 5,486,585 | 1/1996 | Murata et al. | 526/130 |

FOREIGN PATENT DOCUMENTS

| | | |
|---|---|---|
| 0621279 | 10/1994 | European Pat. Off. . |
| 06184226 | 7/1994 | Japan . |

*Primary Examiner*—David W. Wu
*Assistant Examiner*—Ling-Siu Choi
*Attorney, Agent, or Firm*—Locke Liddell & Sapp, LLP

[57] ABSTRACT

A catalysis system containing an olefin polymerization catalyst having at least one Group 3 to Group 10 transition metal or one of the Lanthanide series of the Periodic Table and an organic support is homogeneous and has particular applicability in the production of polyolefins having narrow molecular weight distribution. The support of the catalysis system is the reaction product of a silicone and a polyamine. The catalysis system has high thermal stability.

20 Claims, No Drawings

CATALYST SYSTEM CONTAINING REACTION PRODUCT OF LIQUID SILICONE AND POLYAMINE

FIELD OF THE INVENTION

The invention relates to novel catalyst systems and the use of such catalyst systems in the polymerization of olefins. The catalyst system of the invention contains an olefin polymerization catalyst and, as a catalyst support, the reaction product of a liquid silicone and a polyamine. A preferred liquid silicone is one having a viscosity at 25 degrees C. of less than 1,000 cst. The catalyst system of the invention is homogeneous. As such, it has particular applicability in the production of polyolefins of narrow molecular weight distribution.

BACKGROUND OF THE INVENTION

Polyolefins are useful for a large variety of applications. These polymers are used to fabricate articles under conventional film blowing, injection molding and blow molding techniques. The molecular weight distribution of the polymer is a determinant in assessing whether the polymers are suitable for these various applications. For example, in injection molding, polyolefin polymers having a narrow molecular weight distribution are preferred. On the other hand, in blow molding, polyolefins having a broad molecular weight distribution are preferred.

Typically, unsupported catalysis systems have too small a particle size for commercial use. Supported catalysis systems are characterized by larger particle sizes and offer improved catalytic efficiency. Further, they are generally more stable and render higher molecular weight polymers.

Supports of the catalysis systems of the prior art, typified by silica gel, traditionally are used under slurry polymerization conditions. Unfortunately, it is often difficult to control the amount of catalyst on a silica gel support. In addition, silica gel is capable of deactivating certain catalysts and further may leave high concentrations of ash in the resulting polymer.

Further, the supported catalysis systems of the prior art are generally incapable of producing polyolefins with the requisite narrow molecular weight distribution needed for injection molding. In addition, such supported catalysis systems are heterogeneous in nature. As such, it is not uncommon for solid particulates or gels to become either deposited within the reactor or engulfed in the resultant polyolefin. The former, referred to as fouling, is often detrimental to the overall process since heat transfer is lost and the reactors typically must be shut down for a difficult cleaning process.

A need therefore exists for the development of a catalysis system which is homogeneous in nature, i.e., either liquid or capable of remaining in solution in the presence of an inert hydrocarbon, and which exhibits high thermal stability and which is capable of producing polyolefins of narrow molecular weight distribution.

SUMMARY OF THE INVENTION

The invention relates to a catalyst system containing an olefin polymerization catalyst containing at least one Group 3 to Group 10 transition metal and an organic support. The support is the reaction product of a liquid silicone and a polyamine.

The resulting catalyst system exhibits a high degree of thermal stability. In addition, the catalyst system is homogeneous. Such homogeneity offers greater control over the concentration of polymerization catalyst during the production of the polymer. The resulting polyolefin has a narrow molecular weight distribution and further has a diminished ash content.

DESCRIPTION OF THE PREFERRED EMBODIMENTS

The catalysis system of the invention comprises an olefin polymerization catalyst and a support. The support is the reaction product of a liquid silicone and a polyamine. The homogeneous catalysis system exhibits high thermal stability thereby permitting the production of polyolefins at increased operating temperatures over those previously realized in the art.

The silicone for use in the invention is one wherein the viscosity at 25 degrees C. is less than 10,000 cst, preferably less than about 1,000 cst, most preferably less than 10 cst.

Exemplary of the liquid silicone for use in the invention are those containing the repeating units of the formula:

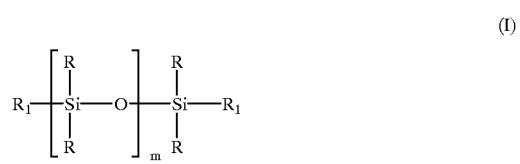

(I)

wherein each R is individually selected from alkyl (or aryl) groups having from 1 to about 12 carbon atoms, $R_1$ is halogen or —OR, and m is generally an integer of from about 1 to about 10,000, preferably about 2 to about 5,000. Specific examples include halogenated or alkoxylated derivatives of hexamethyldisiloxane, octamethyltrisiloxane, methylethyl-polysiloxane, dimethylpolysiloxane, hexamethylcyclotrisiloxane, octamethylcyclo-tetrasiloxane and the like.

In a particularly preferred embodiment, the silicone may be of the formula (I) above where R is methyl or ethyl, and m is 1 to about 100, most preferably between 1 to 6. Particularly desirable results have been demonstrated wherein R is methyl and $R_1$ is chlorine.

The polyamine that is reacted with the liquid silicone typically contains from 2 to about 35, preferably about 2 to about 20, carbon atoms. Since diamines reduce the amount of crosslinking, they are preferred. However, tri- and tetra-amines may also be employed.

Representative polyamines are of the generic formula:

$H_2N-R_2-(T-R_2)_t-NH_2$ (II)

wherein $R_2$ is a hydrocarbyl group such as an alkyl, aryl, alkaryl or aralkyl (typically of 1 to about 12 carbon atoms) which further may be optionally substituted with a group selected from $NH_2$, $NHR_2$, $N(R_2)_2$, haloalkyl or halogen (preferably —Cl or —Br); t is 0, 1 or 2 (preferably 0 or 1) and T is —O—, carbonyl, sulfonyl, sulfide, or

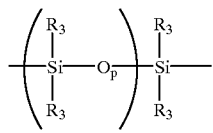

(III)

wherein p is 1 to 200, preferably to 100, most preferably 3 to 12, and $R_3$ is a $C_1$–$C_{12}$, preferably $C_1$–$C_3$, hydrocarbyl group, most preferably methyl or a halogenated hydrocarbyl group containing up to 12 carbon atoms.

The low color of aliphatic amines makes them a particularly preferred species. Most preferred are those amines having between from about 5 to about 12 carbon atoms. Amines having fewer than 5 carbon atoms typically bring the transition metals bonded to them too close together for effective catalysis. Amines having more than 12 carbon atoms tend to lower the concentration of transition metal to support polymer.

Examples of suitable aromatic amines include m-phenylenediamine; p-phenylenediamine; 2,5-dimethyl-1,4-phenylenediamine; 2,4, 2,5- and 2,6-diaminotoluene; p-xylylenediamine; m-xylylenediamine; 4,4'-diaminobiphenyl; 4,4'-diaminodiphenyl ether (or 4,4'-oxydianiline); 3,4'-oxydianiline; 4,4'-diaminobenzophenone; 3,3-diaminophenyl sulfone; 3,4'-diaminophenyl sulfone; 4,4-diaminophenyl sulfone; m,m-sulfone dianiline; m,p-sulfone dianiline; p,p-sulfone dianiline; 4,4'-diaminodiphenyl sulfide; 3,3'-diaminodiphenyl sulfone; 3,3' or 4,4'-diaminodiphenylmethane; m,m-methylenedianiline; p,p-methylene dianiline; 3,3'-dimethylbenzidine; 2,2'-bis[(4-aminophenyl)-1,3-diisopropyl]benzene; 4,4'-isopropylidenedianiline (or bisaniline); 2,2'-bis[(4-aminophenyl)-1,3-diisopropyl]benzene or 3,3'-isopropylidenedianiline (or bisaniline M); methylene dianiline; 1,4-bis(4-aminophenoxy)benzene; 1,3-bis(4-aminophenoxy) benzene; 4,4'-bis(4-aminophenoxy) biphenyl; 1,3-bis(3-aminophenoxy)benzene; 4,4'-bis(4-aminophenoxy)biphenyl; 2,4-diamine-5-chlorotoluene; 2,4-diamine-6-chlorotoluene; 2,2-bis-[4(4-aminophenoxy) phenyl]propane; trifluoromethyl-2,4-diaminobenzene; trifluoromethyl-3,5-diaminobenzene; 2,2-bis(4-aminophenyl)hexafluoropropane; 2,2-bis(4-phenoxy aniline) isopropylidene; 2,4,6-trimethyl-1,3-diaminobenzene; 4,4'-diamino-5,5'-trifluoromethyl diphenyloxide; 3,3'-diamino-5,5'-trifluoromethyl diphenyloxide; 4,4'-tri-fluoromethyl-2,2'-diamino biphenyl; 2,4,6-trimethyl-1,3-diaminobenzene; 4,4'-oxybis[(2-trifluoromethyl) benzeneamine]; 4,4'-oxybis[(3-trifluoromethyl) benzeneamine]; 4,4'-thiobis[(2-trifluoromethyl)benzeneamine]; 4,4'-thiobis[(3-trifluoromethyl)benzeneamine]; 4,4'-sulfoxylbis[(2-trifluoromethyl)benzene-amine]; 4,4'-sulfoxylbis[(3-trifluoromethyl)benzeneamine]; 4,4'-ketobis[(2-trifluoromethyl)benzeneamine]; 4,4'-[(2,2,2-trifluoromethyl-1 -(trifluoro-methyl)-ethylidine)bis(3-trifluoromethyl) benzeneamine]; and 4,4'-dimethyl-silylbis [(3-trifluoromethyl)benzeneamine].

Specific examples of suitable aliphatic amines include 2-methyl-1,5-diamino pentane, 1,6-hexanediamine, 1,8-octanediamine, 1,12-diaminododecane, 1,4-diaminocyclohexane, and 1,4-bis-(aminomethyl)-cyclohexane.

Examples of diamines includes those of formula (IV):

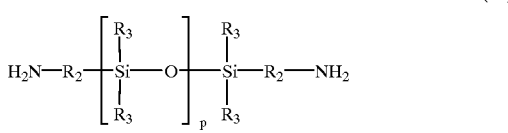

(IV)

where $R_3$ is —$CH_3$, —$CF_3$, —$CH\!=\!CH_2$, —$(CH_2)_gCF_3$, where g is 1 to 12, —$C_6H_5$, and —CHF—$CF_3$. Examples of the $R_2$ group include —$(CH_2)_q$—, —$(CF_2)_q$, —$(CH_2)_q(CF_2)_q$—, and —$C_6H_4$—, where each q is independently chosen from 1 to 10.

The polyamine may further be a diaminoanthraquinone.

The reaction between polyamine and the liquid silicone is conducted in the presence of an organic solvent. Organic solvents which are preferred as the media for conducting the reaction of polyamine and silicone include toluene, hexane, diethyl ether and tetrahydrofuran (THF). Hexane is particularly preferred. In a preferred embodiment, the organic solvent is the same solvent employed in the polymerization of the olefin(s).

The reactivity of the polyamine and liquid silicone may be increased by further conducting the reaction in the presence of a compound capable of abstracting a proton from the primary amine group. Examples of such proton-abstraction compounds include alkyl lithium compounds, e.g., methyl lithium or butyl lithium, or trialkylamines such as triethyl amine. The former is particularly effective in scavenging the acid byproduct.

The reaction of the polyamine with the liquid silicone is generally conducted in the organic solvent at a temperature ranging between from about −78° C. to about room temperature. Stoichiometric quantities of the polyamine and silicone are preferably used. While the reaction proceeds rapidly, it should be left overnight to ensure completion. The resulting reaction product is a liquid.

The reaction product may be represented by the general formula

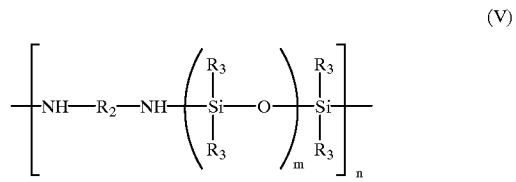

(V)

where $R_3$, $R_2$, and m are as defined above, and n is between from about 2 to about 500, preferably between from about 4 to about 50.

The olefin polymerization catalyst, which when combined with the support constitutes the catalysis system of the invention, may be any conventional polyolefin catalyst which contains a a Group 3 to Group 10 metal or one of the Lanthanide series of the Periodic Table. Preferred are those containing a Group 4b, 5b or 6b transition metal; preferably Ti, Zr, Cr and V; most preferably Ti and Zr.

Included within such metallic olefin polymerization catalysts are trivalent or tetravalent metallic compounds of the general formula $M(R_4)_y$ wherein M is a Group 3 to Group 10 metal or one of the Lanthanide series as specified above, preferably titanium, vanadium, chromium or zirconium and y is either 3 or 4 and further wherein $R_4$ is independently selected from halogen (preferably chlorine or bromine), a $C_1$–$C_{20}$ alkyl, an aryl (preferably a $C_6$–$C_{18}$ aryl), a $C_7$–$C_{20}$ alkaryl or aryalkyl, a $C_1$–$C_{20}$ siloxy and an amide.

The olefin polymerization catalyst may further contain π-bonded ligands, such as the mono-, bi- or tri-cyclopentadienyl or substituted cyclopentadienyl metal compounds. Preferred are the monocyclopentadienyl metal compounds or substituted derivatives thereof. Representative catalysts include the cyclopentadienyl metal compounds set forth in U.S. Pat. No. 5,324,800, herein incorporated by reference. Preferred amongst the cyclopentadienyl metal compounds are those represented by the general formulae:

$$(C_5R^1_w)_f R^2_s (C_5R^1_w) MQ_{3-f} \qquad (VI);$$

and

$$R^2_s (C_5R^1_w)_2 MQ^1 \qquad (VII)$$

wherein
- $(C_5R^1_w)$ is a cyclopentadienyl or substituted cyclopentadienyl; each $R^1$ is the same or different and is hydrogen or a hydrocarbyl radical such as alkyl, alkenyl, aryl, alkylaryl or arylalkyl radical containing from 1 to 20 carbon atoms or two carbon atoms are joined together to form a $C_4$–$C_6$ ring;
- $R^2$ is a $C_1$–$C_4$ alkylene radical, a dialkyl germanium or silicon [such as silyl or a compound of the formula —Si($R_5$)$_t$ wherein t is 2 or 3 and further wherein each $R_5$ is —H, a $C_1$–$C_{10}$ (preferably a $C_1$–$C_4$) alkyl group, an aryl such as benzyl or phenyl or a benzyl or phenyl group substituted with one or more $C_1$–$C_4$ alkyl groups] or an alkyl phosphine or amine radical bridging two $(C_5R^1_w)$ rings;
- Q is a hydrocarbyl radical such as aryl, alkyl, alkenyl, alkylaryl or arylalkyl radical having from 1–20 carbon atoms or halogen and can be the same or different,
- $Q^1$ is an alkylidene radical having from 1 to about 20 carbon atoms,
- s is 0 or 1;
- f is 0, 1 or 2 provided that when f is 0, s is 0;
  - when w is 4 s is 1;
  - when w is 5 s is 0;
- at least one $R^1$ is a hydrocarbyl radical when Q is an alkyl radical and
- M is preferably a Group 4b, 5b or 6b metal, desirably Ti or Zr, most preferably Ti.

Illustrative but non-limiting examples of such metallocenes are monocyclopentadienyl titanocenes such as cyclopentadienyl titanium trichloride, pentamethylcyclopentadienyl titanium trichloride; bis(cyclo-pentadienyl) titanium diphenyl, the carbene represented by the formula Cp$_2$Ti=CH$_2$•Al(CH$_3$)$_2$Cl and derivatives of this reagent such as Cp$_2$Ti=CH$_2$•Al(CH$_3$)$_3$, (Cp$_2$TiCH$_2$)$_2$,

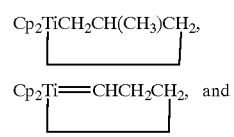

Cp$_2$Ti=CH$_2$•AlR'''$_2$Cl wherein Cp is a cyclopentadienyl or substituted cyclopentadienyl radical and R''' is an alkyl, aryl or alkylaryl radical having from 1–18 carbon atoms; substituted bis(Cp)Ti(IV) compounds such as bis(indenyl) titanium diphenyl or dichloride, bis (methylcyclopentadienyl)titanium diphenyl or diahalides and other dihalide complexes; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes silicone, phosphine, amine or carbon bridged cyclopentadiene complexes such as dimethyl silyldicyclo-pentadienyl titanium diphenyl or dichloride, methyl phosphine dicyclopentadienyl titanium diphenyl or dichloride, methylenedicyclopentadienyl titanium diphenyl or dichloride, ethylene bis(4,5,6, 7-tetrahydroindenyl) titanium dichloride and other dihalide complexes and the like.

Illustrative but non-limiting examples of the zirconocenes which can be employed in accordance with this invention are cyclopentadienyl zirconium trichloride, pentamethylcyclopentadienyl zirconium trichloride, bis(cyclopentadienyl) zirconium diphenyl, bis(cyclopentadienyl)zirconium dimethyl, the alkyl substituted cyclopentadienes such as bis(ethylcyclopentadienyl)zirconium dimethyl, bis(β-phenylpropylcyclopentadienyl)zirconium dimethyl, bis (methylcyclopentadienyl)zirconium dimethyl and dihalide complexes of the above; dialkyl, trialkyl, tetraalkyl, and pentaalkyl cyclopentadienes such as bis (pentamethylcyclopentadienyl)zirconium dimethyl, bis(1,2-dimethylcyclopentadienyl)zirconium dimethyl, bis(1,3-diethylcyclopentadienyl) zirconium dimethyl and dihalide complexes of the above; silicone, phosphorous, and carbon bridged cyclopentadiene complexes such as dimethylsilyl-dicyclopentadienyl zirconium dimethyl or dihalide, methylphosphine dicyclopentadienyl zirconium dimethyl or dihalide and methylene dicyclopentadienyl zirconium dimethyl or dihalide, carbenes represented by the formulae Cp$_2$Zr=CH$_2$P(C$_6$H$_5$)$_2$CH$_3$ and derivatives of these compounds such as

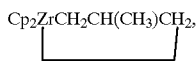
Cp$_2$ZrCH$_2$CH(CH$_3$)CH$_2$,

In a further preferred embodiment, the catalyst may be described by the formulae (VI) and (VII) above wherein f is 0 or 1 and $R^2$ is independently selected from the group consisting of methylene, ethylene, 1,2-phenylene, dimethyl silyl, diphenyl silyl, diethyl silyl and methyl phenyl silyl.

The olefin polymerization catalyst for use in the invention may further be any of those defined as the "constrained geometry catalysts" set forth in U.S. Pat. Nos. 5,272,236 and 5,278,272, herein incorporated by reference. Such catalysts comprise a metal coordination complex of a metal and a delocalized pi-bonded moiety substituted with a constrain-inducing moiety; the complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent; provided further that for such complexes comprising more than one delocalized, substituted pi-bonded moiety, wherein only one thereof for each metal atom of the complex is a cyclic, delocalized, substituted pi-bonded moiety.

Preferred catalyst complexes correspond to the formula:

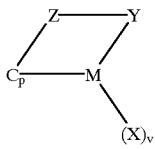
(VIII)

wherein:
  Cp, the cyclopentadienyl or substituted cyclopentadienyl group, is bound in an $\eta^5$ bonding mode to M;
  Z is a moiety comprising boron, or a member of Group 14 and optionally sulfur or oxygen, said moiety having up to 20 non-hydrogen atoms, and optionally Cp and Z together form a fused ring system;
  X independently each occurrence is an anionic ligand group or neutral Lewis base ligand group having up to 30 non-hydrogen atoms;
  v is 0, 1, 2, 3, or 4 and is 2 less than the valence of M; and
  Y is an anionic or nonanionic ligand group bonded to Z and M comprising nitrogen, phosphorus, oxygen or sulfur and having up to 20 non-hydrogen atoms; optionally Y and Z together form a fused ring system.

In a preferred mode, such complexes correspond to the formula:

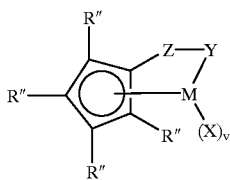
(IX)

wherein:
  each occurrence of R" is independently selected from the group consisting of hydrogen, alkyl, aryl, silyl, germyl, cyano, halo and combinations thereof having up to 20 non-hydrogen atoms;
  each occurrence of X is independently selected from the group consisting of hydride, halo, alkyl, aryl, silyl, germyl, aryloxy, alkoxy, amide, siloxy, neutral Lewis base ligands and combinations thereof having up to 20 non-hydrogen atoms;
  Y is —O—, —S—, —NR*—, —PR*—, or a neutral two electron donor ligand selected from the group consisting of OR*, SR*, NR*$_2$ or PR*$_2$;
  M is as previously defined; and
  Z is SiR*$_2$, CR*$_2$, SiR*$_2$SiR*$_2$, CR*$_2$CR*$_2$, CR*=CR*, CR*$_2$SiR*$_2$, GeR*$_2$, BR*, BR*$_2$;
wherein
  each occurrence of R* is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system; and
  –v is 1 or 2.

Most highly preferred complex compounds are amidosilane- or amidoalkanediyl-compounds corresponding to the formula:

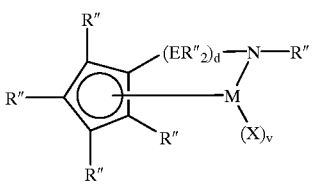
(X)

wherein:
  M is titanium, zirconium or hafnium, bound in a $\eta^5$ bonding mode to the cyclopentadienyl group;
  each occurrence of R" is independently selected from the group consisting of hydrogen, silyl, alkyl, aryl and combinations thereof having up to 10 carbon or silicon atoms;
  E is silicon or carbon;
  each occurrence of X is independently hydride, halo, alkyl, aryl, aryloxy or alkoxy of up to 10 carbons;
  d is 1 or 2; and v is 2.

Examples of the above most highly preferred metal coordination compounds include compounds wherein the R" on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R" on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc. Specific compounds include (tert-butylamido)(tetramethyl-$\eta^5$-cyclopentadienyl)-1,2-ethanediylzirconium dichloride, (tertbutylamido) (tetramethyl-$\eta^5$-cyclopentadienyl) 1,2-ethanediyltitanium dichloride, (methylamido)(tetramethyl-$\eta^5$-cyclopentadienyl)-1,2-ethanediylzirconium dichloride, (methylamido) (tetramethyl-$\eta^5$-cyclopentadienyl)-1,2-ethanediyltitanium dichloride, (ethylamido)(tetramethyl-$\eta^5$-cyclopentadienyl)methylenetitanium dichloro, (tertbutylamido)dibenzyl(tetramethyl-$\eta^5$-cyclopentadienyl) silanezirconium dibenzyl, (benzylamido)dimethyl (tetramethyl-$\eta^5$-cyclopentadienyl) silanetitanium dichloride, (phenylphosphido) dimethyl(tetramethyl $\eta^5$-cyclopentadienyl) silanezirconium dibenzyl, (tertbutylamido)dimethyl (tetramethyl-$\eta^5$-cyclopentadienyl) silanetitanium dimethyl, and the like.

Still further the catalyst for use in the catalysis system of the invention may be one of those set forth in either U.S. Pat. No. 5,434,116 or U.S. Pat. No. 5,539,124, both of which are herein incorporated by reference. Such catalysts include those represented by the general formula

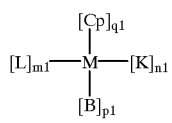

where L is a ligand, or mixture of ligands, each having 4 to 30 carbon atoms and containing at least two fused rings, one of which is a pyrrolyl ring, Cp is a ligand containing a cyclopentadienyl ring, where two L ligands or an L and a Cp ligand can be bridged, B is a Lewis base, K is halogen, alkoxy from $C_1$ to $C_{20}$, siloxy from $C_1$ to $C_{20}$, N(R$_2$)$_2$, or mixtures thereof, R$_2$ is as defined above, M is preferably titanium, zirconium, or mixtures thereof, m1 is a number from 1 to 4, n1 is a number from 0 to 2, p1 is a number from 0 to 2, q1 is a number from 0 to 1, and m1+n1+q1=4. In the formula, K is preferably halogen and is more preferably either chlorine or bromine, but alkoxy groups, such as methoxy (CH$_3$O—), ethoxy (CH$_3$CH$_2$O—), or siloxy (R$_6$)$_3$SiO—, where R$_6$ is alkyl from C$_1$ to C$_{20}$, should also be mentioned. Also, m1 is preferably 4.

Examples of L groups that can be used include alkyl substituted pyrrolyl rings,

(XII)

such as 2-methylpyrrolyl, 3-methylpyrrolyl, 2,5-dimethylpyrrolyl, 2,5-di-tert-butylpyrrolyl, aryl substituted pyrrolyl rings such as 2-phenylpyrrolyl, 2,5-diphenylpyrrolyl, indolyl, alkyl substituted indolyls

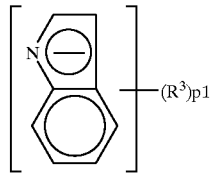

(XIII)

such as 2-methylindolyl, 2-tert-butylindolyl, 3-butylindolyl, 7-methylindolyl, 4,7-dimethylindolyl, aryl substituted indolyls such as 2-phenylindolyl, 3-phenylindolyl, 2-naphthylindolyl, isoindolyl, and alkyl and aryl substituted isoindolyls

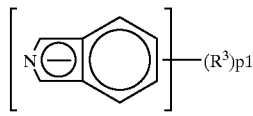

(XIV)

and carbazolyl and alkyl substituted carbazolyls

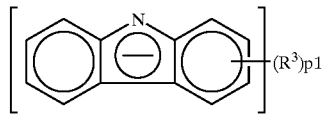

(XV)

In the formulas, each R$^3$ is preferably independently selected from hydrogen, alkyl from C$_1$ to C$_{10}$, and aryl from C$_6$ to C$_{10}$ and p1 is the number of substituents on the ring. (In formula XV, for instance, p is 8.) The alkyl and aryl substituents on the pyrrolyl ring-containing ligand are not on the nitrogen atom in the ring but are on the carbon atoms of the ring. Particularly preferred L ligands are the carbazolyl and C$_1$ to C$_4$ alkyl indolyls in the 2 or 7 position, or in both positions.

Examples of Lewis bases, B, which can be used include diethyl ether, dibutyl ether, tetrahydrofuran, and 1,2-dimethoxyethane. The Lewis base B is residual solvent and the bond between B and M is not a covalent bond.

The Cp ligand can be a cyclopentadienyl ring with 0 to 5 substituent groups,

(XVI)

where each substituent group, R$^4$, is independently selected from a C$_1$ to C$_{20}$ hydrocarbyl group and r is a number from 0 to 5.

In the case in which two R$^4$ groups are adjacent, they can be joined to produce a ring which is fused to the Cp ring. Examples of alkyl substituted Cp rings include butyl cyclopentadienyl, methyl cyclopentadienyl, and pentamethylcyclo-pentadienyl. Examples of fused Cp ring ligands include indenyl, tetrahydroindenyl, fluorenyl, and 2-methylindenyl.

Groups that are preferably used to bridge two ligands include methylene, ethylene, 1,2-phenylene, dimethyl silyl, diphenyl silyl, diethyl silyl, and methyl phenyl silyl. Normally, only a single bridge is used in a catalyst.

Still further, the catalyst used in this invention may be one of those represented in U.S. patent application Ser. No. 08/428,384, now abandoned herein incorporated by reference. Such catalysts include those represented by the general formula

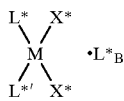

(XVII)

where L* is a ligand having the formula

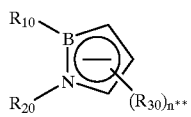

(XVIII)

L*' is L*, Cp, Cp*, indenyl, fluorenyl, NR$_2$, OR$_{25}$, or halogen, L* can be bridged to L*', X* is halogen, NR$_2$, OR$_{25}$, or alkyl from C$_1$ to C$_{12}$, M is preferably titanium, zirconium, or hafnium, n** is 0 to 3, R$_{25}$ is alkyl from C$_1$ to C$_{12}$ or aryl from C$_6$ to C$_{12}$, R$_{10}$ is R$_{25}$, alkaryl from C$_6$ to C$_{12}$, aralkyl from C$_6$ to C$_{12}$, hydrogen, or Si(R$_{25}$)$_3$, R$_{20}$ is R$_{10}$, halogen, COR$_{25}$, COOR$_{25}$ SOR$_{25}$, or SOOR$_{25}$, R$_{30}$ is R$_{20}$, OR$_{25}$, N(R$_{25}$), SR$_{25}$, or a fused ring system, Cp is cyclopentadienyl, and Cp* is pentamethylcyclopentadienyl.

The X* group is preferably halogen and most preferably chlorine as those compounds are more readily available. The R$_{25}$ group is preferably alkyl from C$_1$ to C$_4$, the R$_{10}$ group is preferably alkyl from C$_3$ to C$_{12}$ or aryl, the R$_{20}$ group is preferably t-butyl or trimethylsilyl, and the R$_{30}$ group is preferably hydrogen or methyl as those compounds are easier to make.

Examples of fused ring structures that can be used include

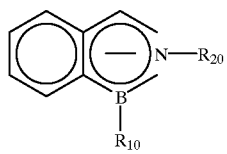
(XIX)

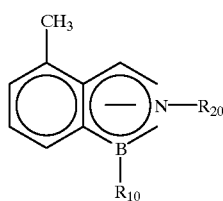
(XX)

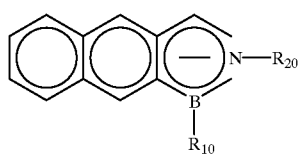
(XXI)

The metal M is most preferably zirconium, as the zirconium catalysts offer a good combination of activity and stability.

Optionally, L* can be bridged to L*'. Groups that can be used to bridge the two ligands include methylene, ethylene, 1,2-phenylene, dimethylsilyl, diphenylsilyl, diethylsilyl, and methylphenylsilyl. Normally, only a single bridge is used.

In the general formula, $L*_B$ is an optional Lewis base. Up to an equimolar amount (with M) of base can be used. The use of the Lewis base is generally not preferred because it tends to decrease catalyst activity. However, it also tends to improve catalyst stability, so its inclusion may be desirable, depending upon the process in which the catalyst is to be used. The base may be residual solvent from the preparation of the azaboroline containing compound or it may be added separately in order to enhance the properties of the catalyst. Examples of bases that can be used include ethers such as diethylether, dibutylether, tetrahydrofuran, 1,2-dimethoxyethane, esters such as n-butylphthalate, ethylbenzoate, and ethyl p-anisate, tertiary amines such as triethylamine, and phosphines such as triethyl phosphine, tributyl phosphine, and triphenyl phosphine.

The catalyst for use in the invention may further be a bora-benzene ring structure which contains a metal such as those described in U.S. Pat. No. 5,554,775, herein incorporated by reference. Included within this group are those catalysts represented the general formula

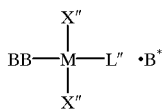
(XXII)

wherein BB is a ligand containing a bora-benzene ring. A bora-benzene ring has the structure

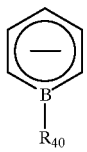
(XXIII)

where $R_{40}$ can be $N(R_{50})_2$, $OR_{50}$, or $R_{50}$, where each $R_{50}$ is independently selected from alkyl from $C_1$ to $C_{10}$, aryl from $C_6$ to $C_{15}$, alkaryl from $C_7$ to $C_{15}$, and aralkyl from $C_7$ to $C_{15}$. The $R_{40}$ group is preferably —$N(R_{50})_2$ or phenyl, as those catalysts have the best properties and, if $R_{40}$ is —$N(R_{50})_2$, then the $R_{50}$ in —$N(R_{50})_2$ is preferably methyl. Examples of BB ligands include

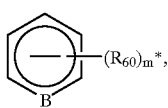
(bora-benzene)
(XXIV)

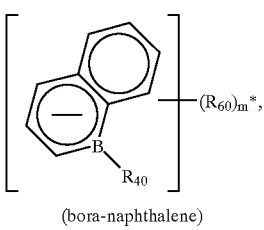
(bora-naphthalene)
(XXV)

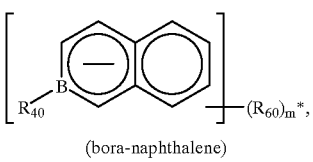
(bora-naphthalene)
(XXVI)

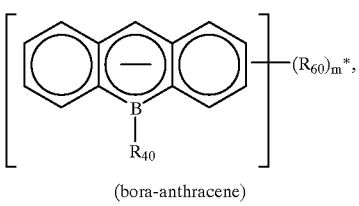
(bora-anthracene)
(XXVII)

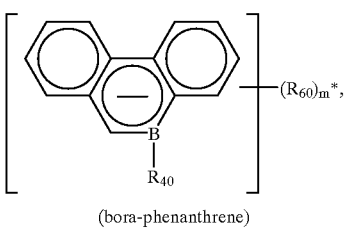
(bora-phenanthrene)
(XXVIII)

where "m*" is 0 to the maximum number of substitutable positions, and is preferably 0 as those catalysts are easier to make. Each $R_{60}$ is independently selected from halogen, alkoxy from $C_1$ to $C_{10}$, and $R_{50}$. The preferred BB ligands are bora-benzene, bora-naphthalene, and bora-anthracene.

In the general formula, each X" is independently selected from hydrogen, halogen, alkoxy from $C_1$ to $C_{10}$, dialkylamino from $C_1$ to $C_{10}$, methyl,

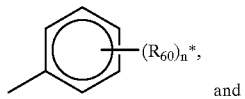
(XXIX)

and

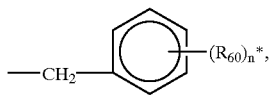
(XXX)

where "n*" is 0 to 5 and preferably is 0. The X" group is preferably chlorine or methyl, as those catalysts are easy to prepare and have good properties.

Also, L" in the general formula can be

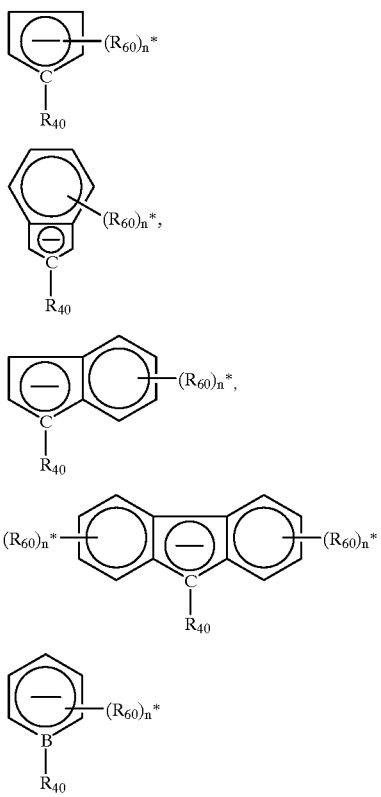

BB, or X". Preferably, L" is BB, cyclopentadienyl, or chlorine because those catalysts are easiest to prepare and have good properties.

Optionally, L" can be bridged to BB. Groups that can be used to bridge two ligands include methylene, ethylene, 1,2-phenylene, dimethyl silyl, diphenyl silyl, diethyl silyl, and methyl phenyl silyl. Normally, only a single bridge is used in a catalyst.

The M group in the general formula can be titanium, zirconium, or hafnium, but is preferably zirconium as those catalysts have a good combination of high activity and good stability.

In the general formula, B* is an optional Lewis base. Up to an equimolar amount (with M) of base can be used. The use of a Lewis base is generally not preferred because it tends to decrease catalyst activity. However, it also tends to improve catalyst stability, so its inclusion may be desirable depending upon the process in which it is being used. The base can be residual solvent from the preparation of the catalyst, or it can be added separately in order to enhance properties of the catalyst. Examples of bases that can be used in this invention include ethers such as diethyl ether, dibutyl ether, tetrahydrofuran, and 1,2-dimethoxyethane, esters such as n-butyl phthalate, ethyl benzoate, and ethyl p-anisate, and phosphines such as triethylphosphine, tributylphosphine, and triphenylphosphine.

The catalyst system of the invention may optionally be used in combination with a co-catalyst. Such cocatalysts or activators are any compound or component which can activate the olefin polymerization catalyst containing either a bulky ligand transition metal compound or a metallocene. Representative co-catalysts include alumoxanes and aluminum alkyls of the formula $Al(R^7)_3$ where $R^7$ independently denotes a $C_1$–$C_8$ alkyl group, hydrogen or halogen. Exemplary of the latter of such co-catalysts are triethylaluminum, trimethylaluminum and tri-isobutylaluminum. ethylalumoxane, or diisobutyl alumoxane. The alumoxanes are polymeric aluminum compounds typically represented by the cyclic formulae $(R^8—Al—O)_b$ and the linear formula $R^8(R^8—Al—O)_b AlR^8$ wherein $R^8$ is a $C_1$–$C_5$ alkyl group such as methyl, ethyl, propyl, butyl and pentyl and b is an integer from 1 to about 20. Preferably, $R^8$ is methyl and b is about 4. Representative but non-exhaustive examples of alumoxane co-catalysts are (poly)methylalumoxane (MAO), ethylalumoxane and diisobutylalumoxane. The co-catalyst can further be tri-alkyl or aryl (substituted or unsubstituted) boron derivative, such as perfluoro-triphenylboron as well as an ionizing activator, neutral or ionic, or compounds such as tri(n-butyl)ammoniumtetrabis (pentafluorophenyl) boron or trityltetrakisperfluorophenylboron which ionize the neutral metallocene compound. Such ionizing compounds may contain an active proton, or some other cation associated with but not coordinated or only loosely coordinated to the remaining ion of the ionizing compound. See, for instance, U.S. Pat. Nos. 5,153,157; 5,198,401; and 5,241,025, all of which are herein incorporated by reference.

The catalyst and co-catalyst may be injected separately into the reactor containing the monomer(s) to be polymerized. The molar ratio of co-catalyst to catalyst may range from about 0.01:1 to about 100,000:1, preferably from about 1:1 to about 1,000:1, most preferably from about 5:1 to about 200:1.

The catalyst systems of the invention are useful in the production of homo- and co-polymers of olefins. Preferred as olefins are ethylene, propylene, butene and octene. Most preferred as olefin is ethylene. The catalyst is particularly useful in the production of copolymers of ethylene and unsaturated monomers such as 1-butene, 1-hexene, 1-octene; mixtures of ethylene and diolefins such as 1,3-butadiene, 1,4-hexadiene, 1,5-hexadiene; and mixtures of olefins and unsaturated comonomers such as norbornene, ethylidene norbornene, and vinyl norbornene.

The catalyst systems of the invention are homogeneous and, as such, are either liquids or are readily soluble in inert hydrocarbons. Such homogeneity offers greater control over the catalyst concentration and may be attributed to the production of a polyolefin exhibiting less ash. They can be utilized in a variety of different polymerization processes. For instance, they can be used in a liquid phase polymerization process (slurry, solution, suspension, bulk or a combination), or gas phase polymerization process. The processes can be used in series or as individual single processes. The pressure in the polymerization reaction zones can range from about 103 kPa (15 psia) to about 345 kPa (50,000 psia). The temperature can range from about 40° C. to about 300° C. Gas phase and slurry polymerizations of olefins are typically conducted at about 70° C. to about 105° C. Solution, suspension and bulk phase polymerizations of olefins is normally conducted at temperatures of about 150° C. to about 300° C.

The homogeneous catalyst systems of the invention further exhibit unusually high thermal stability, enabling their use over a very wide range of temperatures. In light of the homogeneity of the catalyst systems, they are particularly useful for the polymerization of olefins in solution phase.

The following examples will illustrate the practice of the present invention in its preferred embodiments. The examples are provided to illustrate the invention and not to limit it. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

In the Examples below, the melt index (MI) of the resulting polymers was measured according to ASTM D-1238, Condition E and Condition F. MI is the melt index measured with a 2.16 kg weight (Condition E). HLMI is the melt index measured with a 21.6 kg weight (Condition F). MFR is the ratio of HLMI to MI.

Example 1

To a solution of 1.00 g (0.0086 mole) 2-methyl-1,5-diaminopentane in 20 cc toluene, cooled to −78° C., was added 10.8 cc (0.0172 mole) of a 1.6 M solution of n-butyl lithium in hexane. After the addition, the slurry was stirred and allowed to warm to room temperature, then stirred an additional 30 minutes at room temperature. The slurry was again cooled to −78° C. and a solution of 2.39 g (0.0086 mole) 1,5-dichlorohexamethyltrisiloxane in 20 cc of toluene was added. Cooling was stopped, the slurry was stirred 16 hours at room temperature and was filtered, which removed 1.3 g of a white solid. To the filtrate, cooled to −78° C., was added 8.4 cc of a 1.6 M solution of n-butyl lithium in hexane. The reaction mixture was stirred for 16 hours at room temperature and was diluted with toluene to a total volume of 60 cc. This solution was divided into three equal portions which were used in Examples 2 to 4 below.

Example 2

To 20 cc of the solution from Example 1, cooled to −78° C., was added 1.18 g cyclopentadienyl zirconium trichloride (1:1 N:Zr). The reaction mixture was stirred for 16 hours at room temperature and toluene was removed in vacuo to yield a solid catalyst used for polymerizations numbered Run 1.

Example 3

To 20 cc of the solution from Example 1, cooled to −78° C., was added 0.59 g cyclopentadienyl zirconium trichloride (2:1 N:Zr). The reaction mixture was stirred for 16 hours at room temperature and toluene was removed in vacuo to yield a solid catalyst used for polymerizations numbered Run 3.

Example 4

To 20 cc of the solution from Example 1, cooled to −78° C., was added 0.393 g cyclopentadienyl zirconium trichloride (3:1 N:Zr). The reaction mixture was stirred for 16 hours at room temperature and toluene removed in vacuo to yield a solid catalyst used for polymerizations numbered Runs 2, 4 and 5.

Example 5

Polymerizations

All polymerizations in this study were conducted in a 1.7 liter reactor. Prior to conducting a polymerization, the reactor was "baked-out" by heating to 130° C. and holding at that temperature for 30 minutes under a nitrogen purge. Ethylene, hydrogen, hexene, butene and nitrogen were treated by passage through columns containing 13× molecular sieves. For a typical polymerization, the reactor was charged with 0.850 l of hexane or toluene and, using a syringe, the required volume of diluted polymethylalumoxane, commercially available from Akzo Chemie. The desired amount of hydrogen was added to the reactor by monitoring the pressure drop (ΔP) from a 1 liter stainless steel vessel pressurized with hydrogen. A toluene solution containing 5 mg of catalyst was added to the reactor by nitrogen over pressure. The reactor was maintained at 80° C. throughout the run. Ethylene containing 10 gms butene was admitted to the reactor and controlled at 1 mPa (150 psia) with feed on demand via a pressure regulator. After the reactor temperature and pressure stabilized, the catalyst slurry was charged into the reactor and polymerization initiated. Ethylene flow was monitored via a Brooks mass flow meter.

Polymerization was terminated by venting the reactor and the polymer recovered by filtration. The polymer was stabilized by the addition of about 1000 ppm of butylated hydroxytoluene/hexane (BHT) and further devolatilized 2 hours at 80° C. in a vacuum oven.

Table I below summarizes the reaction conditions for each of Runs 1 through 5. In the table Al/M is the ratio of moles of aluminum in polymethylalumoxane to moles of metal (zirconium) in the catalyst. Melt flow properties of the polymer were determined in accordance with ASTM D-1238. Table II presents the results from each of the catalyst preparations.

TABLE I

| Run | Catalyst Preparation | Solvent | Molar Ratio Al/M | $H_{2, \Delta P}$ | Reaction Time (minutes) |
|-----|----------------------|---------|------------------|-------------------|-------------------------|
| 1   | Ex 2                 | toluene | 1242             | 5                 | 15                      |
| 2   | Ex 4                 | toluene | 1841             | 5                 | 15                      |
| 3   | Ex 3                 | toluene | 1203             | 5                 | 15                      |
| 4   | Ex 4                 | toluene | 1473             | 0                 | 15                      |
| 5   | Ex 4                 | hexane  | 1167             | 5                 | 60                      |

TABLE II

| Run | Catalyst Productivity (kg/gM/hr) | MI  | HLMI | MFR |
|-----|----------------------------------|-----|------|-----|
| 1   | 151                              | 4.6 | 117  | 26  |
| 2   | 1090                             | 26  | 451  | 18  |
| 3   | 246                              | 4.5 | 110  | 24  |

TABLE II-continued

| Run | Catalyst Productivity (kg/gM/hr) | MI | HLMI | MFR |
|---|---|---|---|---|
| 4 | 489 | 0.14 | 4.8 | 34 |
| 5 | 25 | | >100 | |

Example 6

To a solution of 0.930 g (0.0086 moles) of 1,4-phenylenediamine in 20 ml of toluene, cooled to −78° C., is added 10.8 ml, (0.0172 moles) of 1.6 M n-butyl lithium in hexane. After the addition is complete, the slurry is stirred and allowed to warm to room temperature. The slurry is then cooled to −78° C. again and a ion of 2.39 g (0.0086 moles) 1,5-dichlorohexamethyltrisiloxane in 20 ml, of toluene is added. The mixture is then allowed to warm to room temperature and stirred 16 hours. The slurry is then filtered to remove the by product and the filtrate is cooled to −78° C. To the cooled filtrate, 8.4 ml of 1.6 M n-butyl lithium in hexane is added. After the addition is complete, the mixture is warmed to room temperature and stirred for 16 hours. This solution is then diluted with toluene to a total volume of 60 ml.

Example 7

A 20 ml sample of the solution from Example 6 is cooled to −78° C. and 1.18 g cyclopentadienyl zirconium trichloride is added. The reaction mixture is allowed to warm to room temperature while stirring for 16 hours. Removal of the toluene by vacuum yields a solid catalyst.

Example 8

A 20 ml sample of the solution from Example 6 is cooled to −78° C. and 1.68 g diisopropylaminoboratabenzene zirconium trichloride is added. The reaction mixture is allowed to warm to room temperature while stirring for 16 hours. Removal of the toluene by vacuum yields a solid catalyst.

What is claimed is:

1. A catalyst system comprising the combination of:
   A. the reaction product of a liquid silicone and a polyamine containing between 2 and 35 carbon atoms; and
   B. an olefin polymerization catalyst containing a Group 3–10 metal or one of the Lanthanide series of the Periodic Table.

2. The catalyst system of claim 1 wherein the polyamine is of the formula:

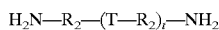

wherein $R_2$ is a hydrocarbyl group;

t is 0, 1 or 2; and

T is —O—, carbonyl, sulfonyl, sulfide or a

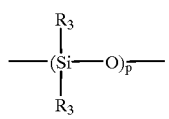

group wherein $R_3$ is a $C_1$-$C_{12}$ hydrocarbyl group optionally substituted with one or more halogen atoms; and p is 1 to 200.

3. The catalyst system of claim 2 wherein $R_2$ further contains at least one halogen atom.

4. The catalyst system of claim 1 wherein the silicone has a viscosity at 25° C. of less than 10,000 cst.

5. The catalyst system of claim 4 wherein the viscosity of the silicone at 25° C. is less than 1,000 cst.

6. The catalyst of claim 1 wherein the liquid silicone is selected from the group consisting of halogenated or alkoxylated derivatives of hexamethyldisiloxane, octamethyltrisiloxane, methylethylpolysiloxane, dimethylpolysiloxane, hexamethylcyclotrisiloxane and octamethylcyclotetrasiloxane.

7. The catalyst system of claim 1 wherein the olefin polymerization catalyst contains a Group 4b, 5b or 6b metal.

8. The catalyst system of claim 7 wherein the metal is either Ti or Zr.

9. The catalyst system of claim 1 wherein the olefin polymerization catalyst is a metallocene.

10. The catalyst system of claim 1 further comprising a co-catalyst.

11. The catalyst system of claim 1 which further comprises a hydrocarbon solvent.

12. A homogeneous supported catalyst system comprising the product of reaction of:
   A. the reaction product of a silicone having a viscosity at 25° C. of less than 10,000 cst. and a polyamine having no more than 35 carbon atoms, as the support; and
   B. an olefin polymerization catalyst containing a Group 4b, 5b or 6b metal.

13. The catalyst system of claim 12 wherein the polyamine is of the formula:

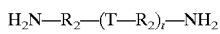

wherein $R_2$ is a hydrocarbyl group;

t is 0, 1 or 2; and

T is —O—, carbonyl, sulfonyl, sulfide or a

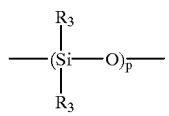

group wherein $R_3$ is a $C_1$-$C_{12}$ hydrocarbyl group optionally substituted with one or more halogen atoms; and p is 1 to 200.

14. The catalyst system of claim 12 wherein the viscosity of the silicone at 25° C. is less than 1,000 cst.

15. The catalyst system of claim 12 wherein the metal is Ti or Zr.

16. The catalyst system of claim 15 wherein the metal is Ti.

17. The catalyst system of claim 12 wherein the olefin polymerization catalyst is a metallocene.

18. The catalyst system of claim 12 further comprising a co-catalyst.

19. The catalyst system of claim 12 which further comprises a hydrocarbon solvent.

20. A process for polymerizing one or more olefins which comprises conducting the polymerization in the presence of the catalyst system of claim 1.

* * * * *